United States Patent
Sinopoli

(10) Patent No.: US 9,454,022 B1
(45) Date of Patent: Sep. 27, 2016

(54) CONTROLLED SELECTIVE VISUAL OCCLUSION SYSTEM AND METHOD

(71) Applicant: Nickolas Joseph Sinopoli, Spicewood, TX (US)

(72) Inventor: Nickolas Joseph Sinopoli, Spicewood, TX (US)

(*) Notice: Subject to any disclaimer, the term of this patent is extended or adjusted under 35 U.S.C. 154(b) by 0 days.

(21) Appl. No.: 14/963,299

(22) Filed: Dec. 9, 2015

Related U.S. Application Data

(60) Provisional application No. 62/089,874, filed on Dec. 10, 2014.

(51) Int. Cl.
   *G02C 7/16* (2006.01)
   *G02C 7/10* (2006.01)
   *G02F 1/1334* (2006.01)
   *G02F 1/133* (2006.01)

(52) U.S. Cl.
   CPC ............... *G02C 7/101* (2013.01); *G02C 7/104* (2013.01); *G02C 7/105* (2013.01); *G02F 1/1334* (2013.01); *G02F 1/13306* (2013.01)

(58) Field of Classification Search
   CPC ........ G02C 7/10; G02C 7/101; G02C 7/102; G02C 7/104; G02C 7/105; G02C 7/16; G02C 2202/06
   USPC ...................... 351/44, 45, 46, 158
   See application file for complete search history.

(56) References Cited

U.S. PATENT DOCUMENTS

| | | |
|---|---|---|
| 4,106,217 A | 8/1978 | Witt |
| 4,279,474 A | 7/1981 | Belgorod |
| 4,283,177 A | 8/1981 | Kron |
| 4,482,326 A | 11/1984 | Witt |
| 4,698,022 A * | 10/1987 | Gilson .............. G09B 9/16 351/47 |
| 4,698,668 A | 10/1987 | Milgram |
| 5,252,069 A | 10/1993 | Lamb et al. |
| 5,276,539 A | 1/1994 | Humphrey |
| 5,308,246 A | 5/1994 | Balocco |
| 5,372,504 A | 12/1994 | Buechler |
| 5,478,239 A | 12/1995 | Fuerst et al. |
| 5,552,841 A * | 9/1996 | Gallorini ............ G02C 7/101 351/44 |
| 5,846,085 A | 12/1998 | Witt, III |
| 7,452,067 B2 | 11/2008 | Gross |
| 7,828,434 B2 | 11/2010 | Coulter et al. |
| 8,622,544 B2 | 1/2014 | Brown et al. |
| 8,708,484 B2 | 4/2014 | Reichow et al. |

* cited by examiner

Primary Examiner — Huy K Mai
(74) Attorney, Agent, or Firm — J. Nevin Shaffer, Jr.

(57) ABSTRACT

A controlled selective visual occlusion system and method includes a visor where the visor includes occlusion areas. An occlusion device covers the occlusion areas and the occlusion device is operable to progressively restrict or allow light in selected occlusion areas. A power source is connected to the occlusion device and a controller is connected to the power source for operation of the occlusion device in the selected occlusion areas.

20 Claims, 2 Drawing Sheets

CONTROLLED SELECTIVE VISUAL OCCLUSION SYSTEM AND METHOD

CROSS REFERENCE TO RELATED APPLICATION

This application claims the benefit of previously filed U.S. provisional patent application No. 62/089,874 filed Dec. 10, 2014 for a "Controlled, Partial, Visual Occlusion System and Method". The Applicant hereby claims the benefit of this provisional application under 35 U.S.C. §119. The entire content of this provisional application is incorporated herein by this reference.

FIELD OF THE INVENTION

This invention relates to a controlled selective visual occlusion system and method. In particular, in accordance with one embodiment, the invention relates to a controlled selective visual occlusion system that includes a visor where the visor includes occlusion areas. An occlusion device covers the occlusion areas and the occlusion device is operable to progressively restrict or allow light in selected occlusion areas. A power source is connected to the occlusion device and a controller is connected to the power source for operation of the occlusion device in the selected occlusion areas.

BACKGROUND OF THE INVENTION

A problem exists with regard to the training of individuals to operate machinery in less than perfect visibility. By way of example only and not by limitation, instrument training is what separates the recreational and professional pilots. Instrument flying is flying primarily by reference to the instruments rather than visual cues. This allows all weather operation and flight in clouds, haze and other obscuration, which is known as Instrument Meteorological Conditions (IMC). Unplanned for entry into IMC is an emergency of varying levels of intensity, depending on such factors as whether the plane and pilot are certified for it and how close they are to the terrain. The emergency is particularly dangerous for helicopters due to their inherent instability, low operating altitude and lack of Instrument Flight Rules (IFR) certification. In 2011 there were fifty-two accidents caused by IMC; forty-five of them fatal.

Presently the state of the art for training to enter into IMC is for the pilot to put on a hood or a pair of glasses that obscures their vision. While this method works fine for simulating total lack of visual cues, the mechanics of putting them on and the knowledge and the expectation of losing visual cues do not allow for the accurate simulation of IMC. What kills pilots is not the flight in IMC it is the transition from visual flight to instrument flight and the spatial disorientation that accompanies an unexpected loss of visual references.

Thus, there is a need in the art for a visual occlusion device that is operable across the entire range of normal visual environments, from perfectly clear to perfectly occluded and that gives no advance indication of a transition from one to another.

It therefore is an object of this invention to provide a controlled selective visual occlusion system and method that is worn by a user that is controllable to provide selective visual occlusion across a full range of visibility, progressively and in selected areas of the system.

SUMMARY OF THE INVENTION

Accordingly, the controlled selective visual occlusion system and method of the present invention, according to one embodiment, includes a visor where the visor includes occlusion areas. An occlusion device covers the occlusion areas and the occlusion device is operable to progressively restrict or allow light in selected occlusion areas. A power source is connected to the occlusion device and a controller is connected to the power source for operation of the occlusion device in some or all of the selected occlusion areas.

All terms used herein are given their common meaning so that, for example, "visor" identifies and describes a device that is designed to be located in front of a user's face. Glasses, goggles, and helmets to which visors are mounted are common and included within the scope of the invention as will be more fully described hereafter. Certainly, glasses, goggles, helmets and the like may also include other devices, straps, head protection, etc., and other elements apart from the visor itself.

"Occlusion area" describes an area of the visor that is identified as that area of the visor covered with an "occlusion device". The "occlusion device" of the present invention includes any device now known or hereafter developed that is controllable according to the requirements of the present invention to operate to selectively and progressively restrict or allow light to pass through the visor as will be described more fully hereafter.

In another aspect of this embodiment, the occlusion device is operable to progressively restrict light in selected occlusion areas over a predetermined period of time.

In one aspect, the occlusion areas cover the entire visor. In a further aspect, separate occlusion devices are provided where the separate occlusion devices cover separate occlusion areas of the visor. In another aspect, the controller operates the separate occlusion devices in less than all of the separate occlusion areas.

In another aspect, the controller is selected from a group of controllers consisting of: toggle switch controllers and push buttons.

In a further aspect, the controller is wirelessly connected with the power source.

In one aspect, the occlusion device is a polymer dispersed liquid crystal.

In a further aspect, the visor is attached to a mounting selected from a group of mountings consisting of: glasses, goggles and helmets.

According to another embodiment of the invention, a controlled selective visual occlusion system includes a visor where the visor includes occlusion areas. Separate occlusion devices are provided that cover the occlusion areas where the separate occlusion devices are operable to progressively restrict or allow light in selected occlusion areas and where the occlusion areas cover the entire visor. A power source is connected to the separate occlusion devices and a controller is connected to the power source for operation of the separate occlusion devices in selected occlusion areas.

In a further aspect of this embodiment, the separate occlusion devices are operable to progressively restrict light in selected occlusion areas over a period of time consisting of from approximately zero to ten seconds.

In another aspect, the controller operates the separate occlusion devices in less than all of the occlusion areas.

In one aspect, the controller is selected from a group of controllers consisting of: toggle switch controllers and push buttons.

In one aspect, the controller is wirelessly connected with the power source.

In a further aspect, the separate occlusion devices are a polymer dispersed liquid crystal.

In another aspect, the visor is attached to a mounting selected from a group of mountings consisting of: glasses, goggles and helmets.

According to another embodiment of the invention, a controlled selective visual occlusion method consists of:
a. providing a visor where the visor includes occlusion areas; an occlusion device covering the occlusion areas where the occlusion device is operable to progressively restrict or allow light in selected occlusion areas; a power source connected to the occlusion device; and a controller connected to the power source for operation of the occlusion device in the selected occlusion areas; and
b. utilizing the controller so as to operate the occlusion device.

In one aspect of this embodiment, the occlusion device is operable to progressively restrict light in selected occlusion areas over a predetermined period of time. In a further aspect, the predetermined period of time ranges from zero to ten seconds.

In another aspect, the occlusion areas cover the entire visor and the occlusion areas are covered by separate occlusion devices where the separate occlusion devices cover separate occlusion areas of the visor.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
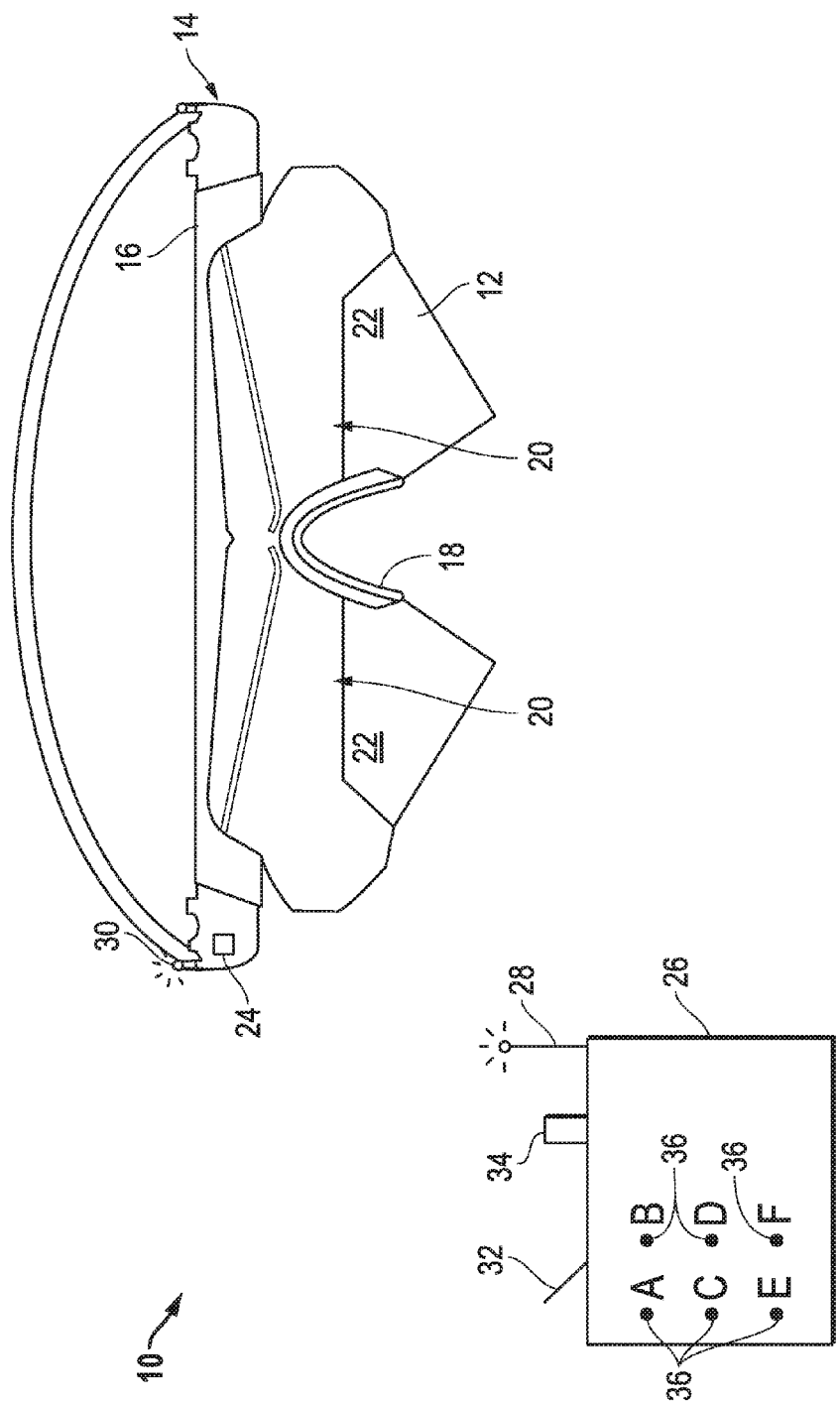
FIG. 1 is a front perspective view of the controlled selective visual occlusion system of the present invention and remote controller.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
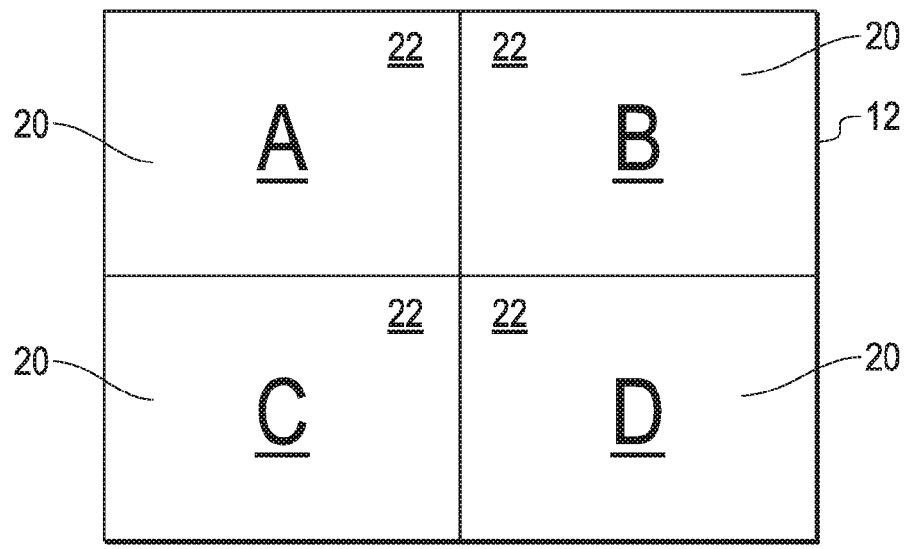
FIG. 2 is a schematic of a representative visor with separate occlusion areas and separate occlusion devices.
Figure 3:
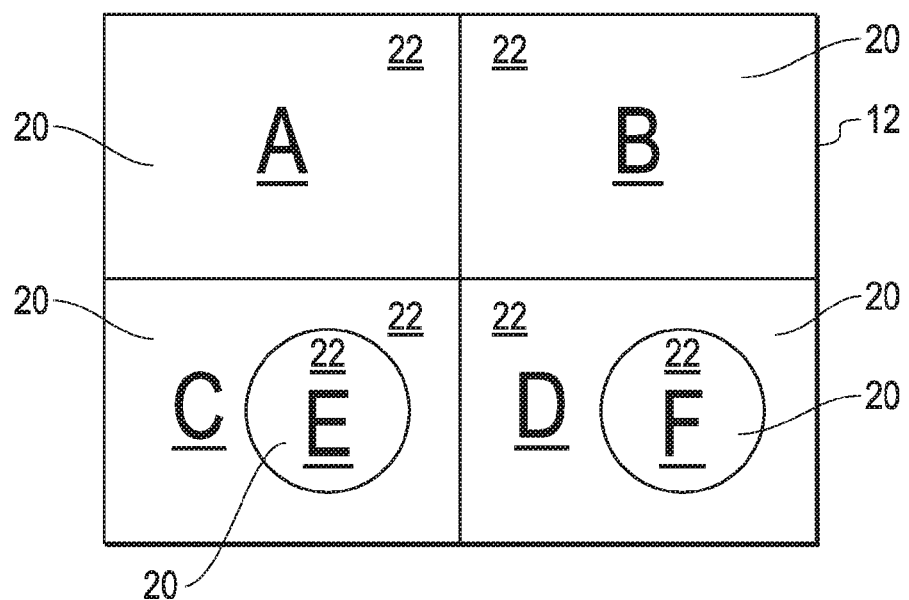
FIG. 3 is a schematic of FIG. 2 with additional separate occlusion areas and additional separate occlusion devices.

A preferred embodiment of the present invention is illustrated by way of example in FIGS. 1-3. With specific reference to FIG. 1, a controlled selective visual occlusion system 10 includes a visor 12. As illustrated, visor 12 is connected, for example only, to mounting 14. Mounting 14 may be in the form illustrated as a headband 16 or any other form of mounting now known or hereafter developed. Other elements may be provided as deemed necessary, such as nose support 18, again for example only.

Visor 12 includes occlusion areas 20 as more clearly understood by reference to FIGS. 2 and 3. Preferably, occlusion areas 20 cover the entire visor 12 as will be more fully described with regard to FIGS. 2 and 3.

Occlusion device 22 covers occlusion areas 20. Again, occlusion device 22 is operable to progressively restrict or allow light in some or all selected occlusion areas 20. Preferably occlusion device 22 is an electro-chromatic device which enables the user to selectively control light passage. Material such as polymer dispersed liquid crystal (PDLC) material, either in a film or dispersed into molded plastics, for example only, is a preferred material but certainly any other similar material capable of performing the functions of the present invention as described herein is suitable.

A power source 24 is connected to occlusion device 22. FIG. 1 illustrates power source 24 in the form of batteries (not shown) located in the headband 16. The connection is made by wires, for example, not shown but well within ordinary skill levels.

A controller 26 is connected to the power source 24 for operation of the occlusion device 20 in selected occlusion areas 22. Controller 26 may be hard wired or wirelessly connected as is known. FIG. 1 illustrates a wireless connection with transmitter 28 in the controller 26 and receiver 30 in the headband 16 connected to power source 24. Connection enables control and control may be selectively applied in any desired fashion as by use of a toggle switch 32 and/or push button 34. By these devices, the entire occlusion device 22 is controlled so that it progressively and selectively either darkens or lightens to prevent or allow light and, therefor, sight. Prior art devices and systems are "all or nothing" devices with no selective control over when and where light will be allowed, as will be more fully described with reference to FIGS. 2 and 3.

Controller 26 also preferably includes selectors 36. Selectors 36 allow a user to pick which occlusion area 20 to manipulate. FIG. 1 shows selectors 36 for occlusion areas A, B, C, D, E and F, for example only.

Referring now to FIGS. 2 and 3, visor 12 is illustrated schematically in the form of a square with four separate occlusions areas 20: A, B, C, and D. According to a preferred embodiment, the entire visor 12 is covered with an occlusion device 22. This is done with separate occlusion devices 22 with one occlusion device 22 covering each separate occlusion area 20, A, B, C, D. In operation then, the user may admit or exclude light from any or all of the separate occlusion areas 20. Further, importantly, occlusion devices 22 may be progressively controlled to gradually darken or lighten or to darken or lighten all at once. Gradual, progressive loss of vision in an airplane may happen in a short period of time or essentially instantaneously. Applicant's controlled selective visual occlusion system 10 provides for all ranges of normal times as for example from zero to ten seconds.

Referring now to FIG. 3, the versatility of the present invention is further illustrated whereby additional separate occlusion devices 22 are provided in separate occlusion areas 20, E and F. This illustrates a situation where the user losses sight totally for a moment and then regains sight but only within the occlusion area 20, E and F, for viewing of the instrument panel (not shown) for example only. Thus, Applicant's system enables control to include total loss of sight both inside and outside of the cockpit, for example, and including limited vision of just the instrument panel. All of these permutations are enabled within a system that a user wears from the begriming to the end of use thus preventing the user from knowing in advance that an IMC event is eminent.

By way of further explanation, controlled selective visual occlusion system and method 10 enables a user to toggle between clear, unobstructed vision and the simulation of IMC without anything more than the flick of a toggle switch 32 or push of a button 34. This allows an instructor pilot, for example, to surprise the pilot under instruction by switching the system without the pilot's knowledge thus accurately replicating IMC. It also allows the pilot to rapidly regain vision outside the aircraft, if the need arises, for example to scan for air traffic or in the event of an actual emergency. The invention therefor allows the operator to replicate not only the loss of visual cues but the surprise that accompanies it that can be so fatal.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A controlled selective visual occlusion system comprising:
   a. a visor wherein said visor includes occlusion areas;
   b. an occlusion device covering said occlusion areas wherein said occlusion device is operable to progressively restrict or allow light in selected occlusion areas;
   c. a power source connected to said occlusion device; and
   d. a controller connected to said power source for operation of said occlusion device in said selected occlusion areas.

2. The system of claim 1 wherein said occlusion device is operable to progressively restrict light in selected occlusion areas over a predetermined period of time.

3. The system of claim 1 wherein said occlusion areas cover the entire visor.

4. The system of claim 3 further including separate occlusion devices wherein said separate occlusion devices cover separate occlusion areas of said visor.

5. The system of claim 4 wherein said controller operates said separate occlusion devices in less than all of said separate occlusion areas.

6. The system of claim 1 wherein said controller is selected from a group of controllers consisting of: toggle switch controllers and push buttons.

7. The system of claim 1 wherein said controller is wirelessly connected with said power source.

8. The system of claim 1 wherein said occlusion device is a polymer dispersed liquid crystal.

9. The system of claim 1 wherein said visor is attached to a mounting selected from a group of mountings consisting of: glasses, goggles and helmets.

10. A controlled selective visual occlusion system comprising:
    a. a visor wherein said visor includes occlusion areas;
    b. separate occlusion devices covering said occlusion areas wherein said separate occlusion devices are operable to progressively restrict or allow light in selected occlusion areas wherein said occlusion areas cover the entire visor;
    c. a power source connected to said separate occlusion devices; and
    d. a controller connected to said power source for operation of said separate occlusion devices in said selected occlusion areas.

11. The system of claim 10 wherein said separate occlusion devices are operable to progressively restrict light in selected occlusion areas over a period of time consisting of from approximately zero to ten seconds.

12. The system of claim 10 wherein said controller operates said separate occlusion devices in less than all of said occlusion areas.

13. The system of claim 10 wherein said controller is selected from a group of controllers consisting of: toggle switch controllers and push buttons.

14. The system of claim 10 wherein said controller is wirelessly connected with said power source.

15. The system of claim 10 wherein said separate occlusion devices are a polymer dispersed liquid crystal.

16. The system of claim 10 wherein said visor is attached to a mounting selected from a group of mountings consisting of: glasses, goggles and helmets.

17. A controlled selective visual occlusion method comprising:
    a. providing a visor wherein said visor includes occlusion areas; an occlusion device covering said occlusion areas wherein said occlusion device is operable to progressively restrict or allow light in selected occlusion areas; a power source connected to said occlusion device; and a controller connected to said power source for operation of said occlusion device in said selected occlusion areas; and
    b. utilizing said controller so as to operate said occlusion device.

18. The method of claim 17 wherein said occlusion device is operable to progressively restrict light in selected occlusion areas over a predetermined period of time.

19. The method of claim 18 wherein said predetermined period of time ranges from zero to ten seconds.

20. The method of claim 17 wherein said occlusion areas cover the entire visor and wherein said occlusion areas are covered by separate occlusion devices wherein said separate occlusion devices cover separate occlusion areas of said visor.

\* \* \* \* \*